(12) United States Patent
Thörn (10) Patent No.: US 8,154,644 B2
(45) Date of Patent: Apr. 10, 2012

(54) SYSTEM AND METHOD FOR MANIPULATION OF A DIGITAL IMAGE

(75) Inventor: Karl Ola Thörn, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 852 days.

(21) Appl. No.: 12/247,300

(22) Filed: Oct. 8, 2008

(65) Prior Publication Data

US 2010/0085446 A1    Apr. 8, 2010

(51) Int. Cl.
*H04N 5/222* (2006.01)
(52) U.S. Cl. .............................. 348/333.02; 348/333.05
(58) Field of Classification Search ........... 348/333.01–333.13, 333.11, 333.12
See application file for complete search history.

(56) References Cited

U.S. PATENT DOCUMENTS

| | | | |
|---|---|---|---|
| 5,884,257 A * | 3/1999 | Maekawa et al. ............. | 704/248 |
| 2005/0001909 A1 * | 1/2005 | Okisu et al. ................. | 348/231.5 |
| 2006/0064639 A1 | 3/2006 | Reid et al. | |
| 2008/0036869 A1 * | 2/2008 | Gustafsson et al. ....... | 348/222.1 |
| 2008/0317346 A1 * | 12/2008 | Taub ............................ | 382/182 |

FOREIGN PATENT DOCUMENTS

WO    2008/115997    9/2008

OTHER PUBLICATIONS

International Search Report and Written Opinion for corresponding application No. PCT/IB2009/005210 dated Jul. 28, 2009.
David G. Stork et al.; "Speechreading: An overview of image processing, feature extraction, sensory integration and pattern recognition techniques"; Oct. 14, 1996; pp. XVI-XXVI.
Wai C. Yau et al.; "Voiceless Speech Recognition Using Dynamic Visual Speech Features"; 2006; pp. 93-101.
Michael Fitzpatrick; "Lip-reading cellphone silences loudmouths"; Apr. 3, 2002.
Anonymous/Cardeguy; "Lip Reading Software"; Feb. 29, 2004.

* cited by examiner

*Primary Examiner* — Timothy J Henn
(74) *Attorney, Agent, or Firm* — Renner, Otto, Boisselle & Sklar, LLP (57) ABSTRACT

A system for rendering a digital image includes a rendering device for rendering a digital image and a camera for capturing a sequence of images of a user. A conversion module converts the sequence of images into a manipulation command for altering the rendering of the digital image. In one embodiment, the conversion module is a lip reading module that converts a sequence of images depicting the motion of the user's facial features into text tag or visual effects command. The text tag or command may then be applied to the digital image. The digital image may be divided into portions containing principle subject matter, and a text tag or visual effects command may be generated for one or more of the image portions. A facial detection module may be employed to detect changes in the user's facial features to navigate among the image portions.

12 Claims, 10 Drawing Sheets

| Photo Database 32 | | | | | | |
|---|---|---|---|---|---|---|
| Photo ID 52 | Position 54 | | Visual Tag 56 | Text Tag 59 | Tagged Frame 62 | Object Motion Data 64 |
| | X | Y | | | | |
| Photo #1 | 5 | 10 | House | House | N/A | N/A |
| | 10 | 10 | Boat | Boat | | |
| | 5 | 15 | Dog | Dog | | |
| Photo #2 | 10 | 10 | Rebecka | Rebecka | | |
| | 30 | 5 | Karl | Karl | | |
| | 20 | 15 | Johan | Johan | | |
| Video #3 | 5 | 15 | Karl | Karl | 96a | →·→ |

FIG. 14

SYSTEM AND METHOD FOR MANIPULATION OF A DIGITAL IMAGE

TECHNICAL FIELD OF THE INVENTION

The present invention relates to electronic devices that render a digital image, and more particularly to a system and methods for rendering and manipulating a digital image or a portion thereof.

DESCRIPTION OF THE RELATED ART

Contemporary digital cameras typically include embedded digital photo album or digital photo management applications in addition to traditional image capture circuitry. Furthermore, as digital imaging circuitry has become less expensive, other portable devices, including mobile telephones, portable data assistants (PDAs), and other mobile electronic devices often include embedded image capture circuitry (e.g. digital cameras) and digital photo album or digital photo management applications in addition to traditional mobile telephony applications.

Popular digital photo management applications include several photograph manipulation functions for enhancing photo quality, such as correction of red-eye effects, and manipulating a digital image by lightening or darkening an image, digitally zooming in or out, rotating an image, and others. Another popular digital photo management manipulation function is a function known as text tagging.

Text tagging is a function in which the user selects a digital photograph or portion thereof and associates a text item therewith. The text item is commonly referred to as a "text tag". When viewing digital photographs, the text tag provides information about the photograph, effectively replacing an age old process of hand writing notes on the back of a printed photograph or in the margins next to a printed photograph in a photo album. Digital text tags also provide an advantage in that they can be easily searched to enable locating and organizing digital photographs within a database.

Similar to text tagging of photographs, there are also applications that provide for the text tagging of documents and other digital images or content. For example, a group of individuals editing a document may provide each other margin comments relating to content. Text tagging may also be employed to highlight content on web pages or comparable image content accessed over the Internet or other network.

When digital photo management or digital image applications are operated on a traditional computer with a traditional user interface (e.g. full QWERTY keyboard, large display, and a convenient pointer device such as a mouse), applying text tags to photographs, documents, or other digital images is relatively easy. The user, for example, simply utilizes the pointer device to select a point within the displayed digital image, mouse-clicks to "open" a new text tag object, types the text tag, and mouse-clicks to apply the text tag to the digital image.

Portable electronic devices, however, such as digital cameras, mobile telephones, portable data assistants (PDAs), and others, typically do not have such a convenient user interface. The display screen is much smaller. The keyboard may have a limited quantity of keys (typically what is known as a "12-key" or "traditional telephone" keyboard), and the pointing device, if present at all, may comprise a touch screen (or stylus activated panel) over the small display. Five-way multi-function keypads also are common. This type of user interface makes the application of text tags to digital photographs and other digital content cumbersome at best.

Speech-to-text applications have been used to generate text without the use of a keyboard, mouse, or associated input devices. Such applications have been employed primarily for document generation. With respect to text tagging a digital image, however, conventional speech-to-text applications have proven less suitable because of the need to place a text tag in a particular location within a digital image. Furthermore, speech-to-text applications may not be suitable in situations in which others are present, who may find audible speech disturbing.

In a separate field of art, eye tracking and gaze direction systems have been contemplated. Eye tracking is the process of measuring the point of gaze and/or motion of the eye relative to the head. The most common contemporary method of eye tracking or gaze direction detection comprises extracting the eye position relative to the head from a video image of the eye. In addition to eye tracking, other forms of face detection are being developed. For example, one form of face detection may detect particular facial features, such as whether an individual is smiling or blinking. It also been contemplated to employ face detection for "lip reading" to convert lip and mouth movements into speech or text. To date, however, such technologies have not been fully utilized in the manipulation of digital photographs and other digital images rendered in a portable electronic device.

SUMMARY

Accordingly, there is a need in the art for an improved system and methods for the manipulation of digital images (and portions thereof) that are rendered on a portable electronic device. In particular, there is a need in the art for an improved system and methods for text tagging and applying visual effects to digital images rendered on a portable electronic device.

Accordingly, a system and methods for rendering a digital image on an electronic device include a rendering device (such as a display) for rendering a digital image, and a camera for capturing a sequence of images of a user. A conversion module converts the sequence of images into a manipulation command for altering the rendering of the digital image in accordance with the manipulation command. In one embodiment, the conversion module is a lip reading module that converts a sequence of images depicting the motion of the user's facial features into text. The text may then be applied as a text tag to the digital image. In another embodiment, the lip reading module may convert the sequence of images into a visual effects command. The digital image also may be divided into portions containing principle subject matter, and a text tag or visual effects command may be generated to be associated with one or more of the portions. A facial detection module, and particularly and eye detection module, may be employed to detect changes in the user's facial features to navigate among the image portions.

Therefore, an aspect of the invention is a first electronic device comprising a rendering device for rendering a digital image, a user image capturing device for capturing a sequence of images of a use, a conversion module for converting the sequence of images into a manipulation command for manipulating the digital image, and a processing circuit for altering the rendering of the digital image in accordance with the manipulation command.

According to one embodiment of the first electronic device, the conversion module comprises a lip reading module and the sequence of images is a sequence of motion of the user's facial features, wherein the lip reading module converts the motion of the user's facial features into the manipulation command.

According to one embodiment of the first electronic device, the lip reading module converts the motion of the user's facial features into a text tag, and the processing circuit alters the rendering of the digital image to include the text tag.

According to one embodiment of the first electronic device, the electronic device further comprises an image analysis module for determining the placement of the text tag within the digital image.

According to one embodiment of the first electronic device, wherein the image analysis module determines the placement of the text tag by identifying at least one image portion within the digital image in which principal subject matter is contained, and placing the text tag within the digital image apart from the image portion depicting the principal subject matter.

According to one embodiment of the first electronic device, the lip reading module converts the motion of the user's facial features into a visual effects command, and the processing circuit alters the rendering of the digital image to implement the visual effects command.

According to one embodiment of the first electronic device, the visual effects command is at least one of lightening the digital image, darkening the digital image, zooming in, zooming out, rotating the digital image, or performing red-eye correction on a subject contained in the digital image.

According to one embodiment of the first electronic device, the electronic device further comprises a storage device for storing the altered digital image.

Another aspect of the invention is a second electronic device comprising a rendering device for rendering a digital image, an image analysis module for selecting at least one image portion within the digital image in which principal subject matter is contained, a user image capturing device for capturing a sequence of images of a user, a conversion module for converting the sequence of images into a manipulation command for manipulating the digital image in a manner associated with the selected image portion, and a processing circuit for altering the rendering of the digital image in a manner associated with the selected image portion in accordance with the manipulation command.

According to one embodiment of the second electronic device, the conversion module comprises a lip reading module and the sequence of images is a sequence of motion of the user's facial features, wherein the lip module converts the motion of the user's facial features into the manipulation command.

According to one embodiment of the second electronic device, the lip reading module converts the motion of the user's facial features into a text tag, and the processing circuit alters the rendering of the digital image to include the text tag associated with the selected image portion.

According to one embodiment of the second electronic device, the lip reading module converts the motion of the user's facial features into a visual effects command, and the processing circuit alters the rendering of the selected image portion within the digital image to implement the visual effects command.

According to one embodiment of the second electronic device, the visual effects command is at least one of lightening the image portion, darkening the image portion, zooming in, zooming out, rotating the image portion, or performing red-eye correction on a subject contained in the image portion.

According to one embodiment of the second electronic device, the electronic device further comprises a navigation device for selecting a second image portion within the digital image. The user image capturing device captures a second sequence of images of the user, the conversion module converts the second sequence of images into a second manipulation command for manipulating the digital image in a manner associated with the second image portion, and the processing circuit alters the rendering of the digital image in a manner associated with the second image portion in accordance with the second manipulation command.

According to one embodiment of the second electronic device, the navigation device comprises a key for receiving a navigation input for selecting the second image portion.

According to one embodiment of the second electronic device, the navigation device comprises a facial detection module for detecting a facial motion of the user corresponding to a directional input.

According to one embodiment of the second electronic device, the facial detection module comprises an eye detection module for detecting the user's eyes, and the directional input is a detected change in the orientation of the user's eyes.

Another aspect of the invention is a method of manipulating a digital image comprising the steps of rendering the digital image, capturing a sequence of images of a user, converting the sequence of images of the user into a manipulation command for altering the rendering of the digital image, and altering the rendering of digital image in accordance with the manipulation command.

According to one embodiment of the method, the method further comprises selecting at least one image portion within the digital image in which principal subject matter is depicted, converting the sequence of images of the user into a manipulation command for altering the rendering of the digital image in a manner associated with the selected image portion, and altering the rendering of the digital image in a manner associated with the selected image portion in accordance with the manipulation command.

According to one embodiment of the method, the method further comprises selecting a second image portion within the digital image in which principal subject matter is depicted, capturing a second sequence of images of a user, converting the second sequence of images of the user into a second manipulation command for altering the rendering of the digital image in a manner associated with the second image portion, and altering the rendering of the digital image in a manner associated with the second image portion in accordance with the manipulation command.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or

DETAILED DESCRIPTION OF EMBODIMENTS

Embodiments of the present invention will now be described with reference to the drawings, wherein like reference numerals are used to refer to like elements throughout. It will be understood that the figures are not necessarily to scale.

Figure 1:
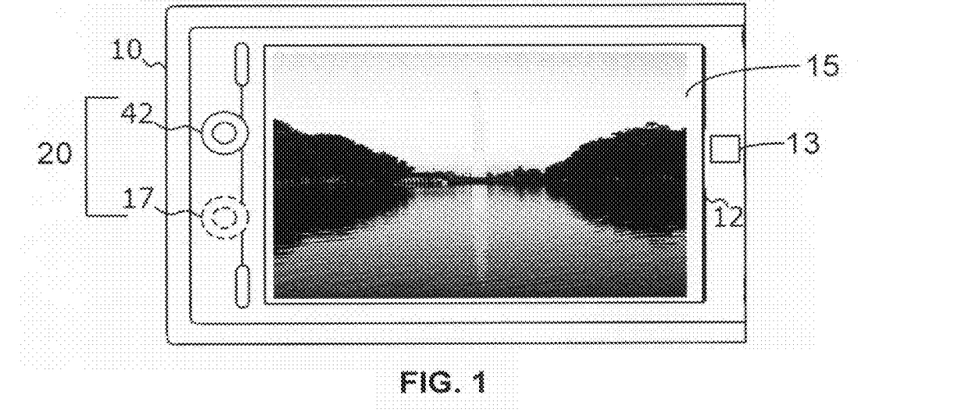
FIG. 1 is a schematic diagram of an exemplary electronic device for use in accordance with an embodiment of the present invention.

With reference to FIG. 1, an exemplary electronic device 10 is embodied in a digital camera, mobile telephone, mobile PDA, or other electronic device having a digital camera function. Such devices may include any portable radio communication equipment or mobile radio terminal, including pagers, communicators, electronic organizers, smartphones, and any communication apparatus or the like having a camera function. Desktop or laptop computers, gaming devices or games consoles, or similar devices having a web camera also may be employed. The particular electronic device, therefore, may be varied without departing from the scope of the invention.

The electronic device 10 has a display 12 for the rendering of information, and particularly for rendering a digital image 15. In the example of the figure, the digital image represents a still photograph. The digital image may be a still or moving video image, and may be derived from any source such as the camera viewfinder, an internal memory, an external or network storage device, or the like. The digital image also may represent an image from a network, such as a portion of an Internet webpage, may be a document image, or may comprise both text and/or non-text portions. The following examples are described primarily in reference to the manipulation of a digital photograph, although it will be appreciated that comparable principles may be applied to any digital image.

The electronic device may have a camera assembly 20 for taking photographs or moving video images. The camera assembly may include a subject image capturing lens 17 that is represented by hidden lines to indicate its presence on the side of the device opposite the user. In this manner, the lens 17 has a field of view directed away from the back side of the display 12 for capturing still and/or motion video images 15, such that the display 12 may operate as the camera viewfinder. The camera assembly 20 may also include a user image capturing device 42 for capturing an image of a user. For example, the user image capturing device may be a user image capturing lens 42 that faces toward the user during use. The lens 42, therefore, may monitor the motions of the user. For example, if the electronic device has a telephone calling function, the lens 42 and the camera assembly 20 may provide a video telephony function that captures an image of the user when the user is participating in a telephone call. As is further described below, lens 42 and camera assembly 20 also may capture an image of the user for face detection, including lip reading and eye tracking functions, in accordance with embodiments of the present invention.

Figure 2:
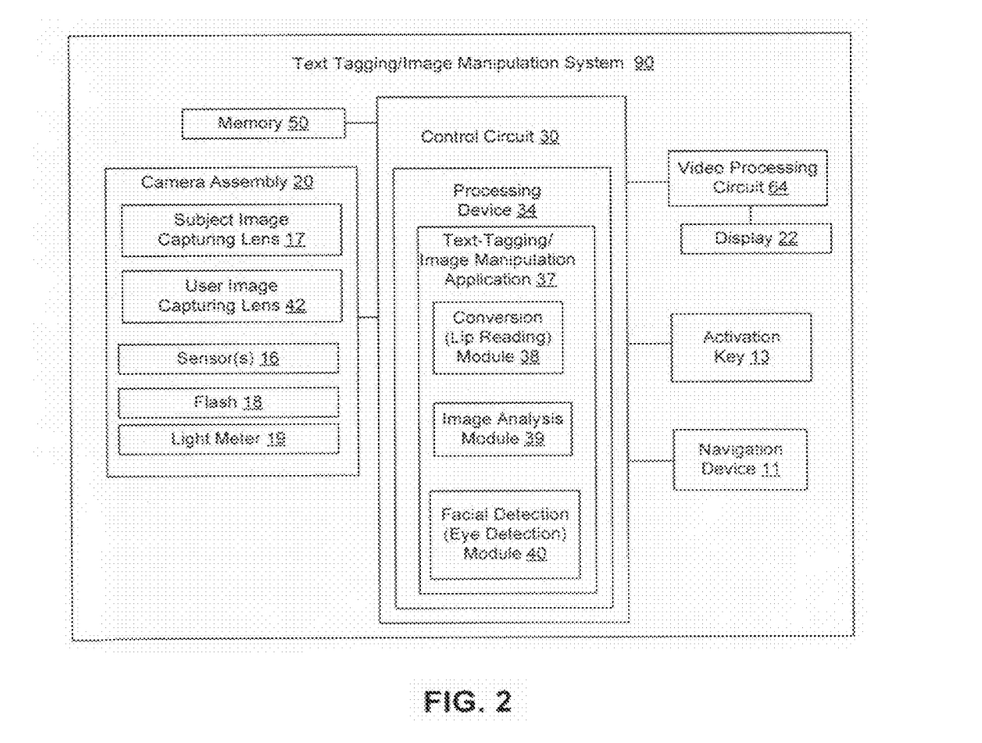
FIG. 2 is a schematic block diagram of operative portions of a text-tagging/image manipulation system that may be incorporated the electronic device of FIG. 1.

FIG. 2 represents a functional block diagram of operative portions of a text-tagging/image manipulation system 90 that may be incorporated into the electronic device 10. Further to the above, the system 90 may include the camera assembly 20 having the subject image capturing lens 17 and the user image capturing lens 42. Camera assembly 20 may also include one or more image sensors 16 for receiving the light from the lenses to generate the images. Each lens 17 and 42 may be associated with its own sensor, or sensing may be performed for both lenses by a common sensor. Camera assembly 20 may also include other features common in conventional digital cameras, such as light meter, a flash, and the like.

It will be appreciated that the digital images to be manipulated as described herein need not come from the camera assembly 20. For example, digital images may be stored in and retrieved from a memory 50. In addition, digital images may be accessed from an external or network source via any conventional wired or wireless network interface (not show).

Referring again to FIG. 2, the system 90 may include a primary control circuit 30 that is configured to carry out overall control of the functions and operations of the system 90, as well as other components of the broader electronic device 10. The control circuit 30 may include a processing device 34, such as a CPU, microcontroller or microprocessor.

Among their functions, to implement the features of the present invention, the control circuit 30 and/or processing device 34 may comprise a controller that may execute program code stored on a machine-readable medium embodied as the text tagging/image manipulation application 37. Application 37 may be a stand-alone software application or form a part of a software application that carries out additional tasks related to the electronic device 10. It will be apparent to a person having ordinary skill in the art of computer programming, and specifically in application programming for mobile telephones, servers or other electronic devices, how to program an electronic device to operate and carry out logical functions associated with the application 37. Accordingly, details as to specific programming code have been left out for the sake of brevity. Also, while the code may be executed by control circuit 30 in accordance with exemplary embodiments, such controller functionality could also be carried out via dedicated hardware, firmware, software, or combinations thereof, without departing from the scope of the invention.

The system 90 may include a rendering device, such as a display 12 for rendering digital images and associated visual content to a user. The display 12 may be coupled to the control circuit 30 by a video processing circuit 64 that converts video data to a video signal used to drive the display. The processing circuit 64 may include any appropriate buffers, decoders, video data processors and so forth. The video data may be generated by the control circuit 30, retrieved from a video file that is stored in the memory 50, derived from an incoming video data stream received from an external network, or obtained by any other suitable method.

Figure 3:
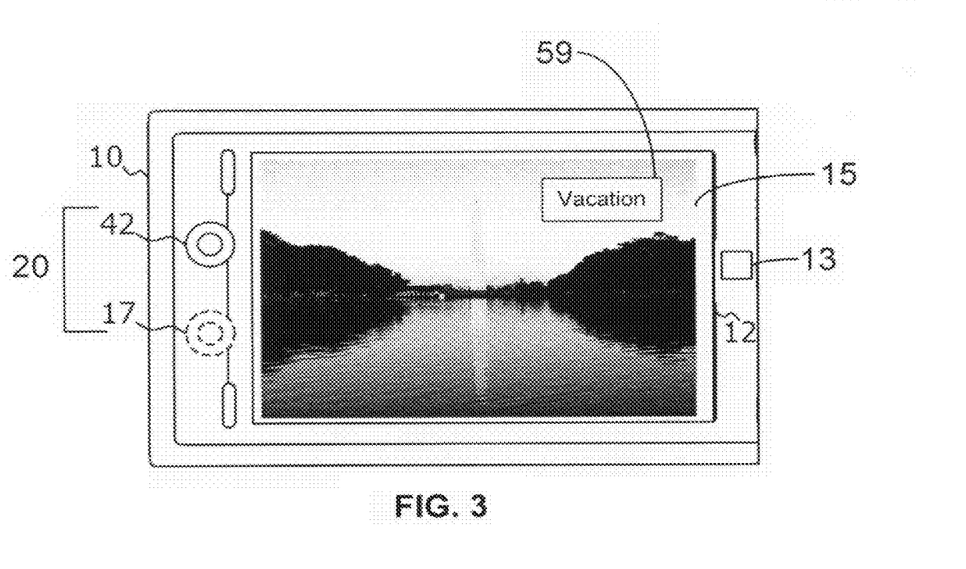
FIG. 3 is a schematic diagram of the exemplary electronic device of FIG. 1 displaying an exemplary modified digital image.

FIG. 3 depicts the electronic device 10 displaying the digital image of FIG. 1. In FIG. 3, a text tag 59, stating "Vacation", has been added to associate a subject matter with the image. In accordance with embodiments of the present invention, the text tag may be generated as follows.

Referring to FIGS. 1-3, a text tag may be applied to any digital image rendered on a rendering device, such as the display 12. The text tagging application 37 may include a conversion module 38 for converting a sequence of images of a user, captured by the lens 42, into a manipulation command. In one exemplary embodiment, the conversion module is a lip reading module 38. In general, the lip reading module 38 may interpret the movement and configuration of a user's lips and mouth into text for text tagging.

The lip reading module 38 may be actuated by a variety of ways of inputting commands in an electronic device. In one embodiment, lip reading may be activated using a dedicated activation key input or button, such as an activation key 13. In this example, if a user presses and holds the key 13, the user image capturing lens 42 of the camera assembly 20 may be employed to detect the motion and configuration of a user's lips and mouth as a sequence of images 52. The sequence of images 52 may then be passed to the lip reading module 38, which interprets the motion and configuration of the sequence of images as speech text.

Figure 4:
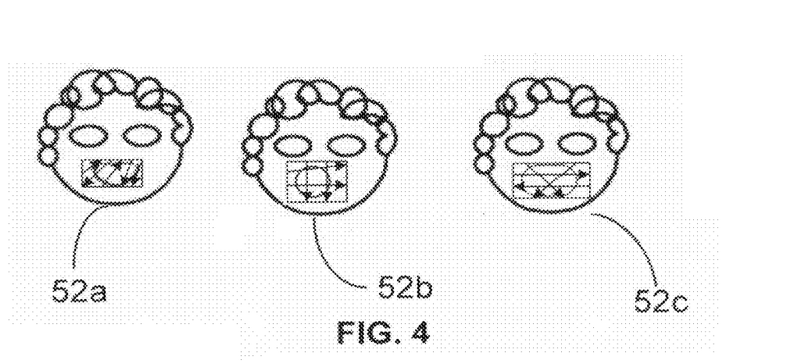
FIG. 4 represents an exemplary sequence of images that may represent changes in the configuration of a user's facial features as may occur during mouthing speech.

The motion and configuration detection may be interpreted by means of object recognition, edge detection, silhouette recognition, or other means for detecting motion as are known in the art. For example, FIG. 4 represents a sequence of images 52a-c that may represent changes in the configuration of a user's mouth as may occur during mouthing speech. As indicated by the arrows in the figure, a change in the position, configuration, and movement of the mouth and lips represent both a change in orientation and a change in velocity of these facial features. There may also be changes in the optical flow in that subtle differences in shadowing and light balance, caused by the changes in feature orientation, may result in gray value changes over consecutive images in the sequence. The changes in feature orientation, feature velocity, and/or optical flow may be analyzed by the lip reading module 38, which may then interpret the images 52a-c to generate a text representation of the words mouthed by the user. The text may be converted into a text tag for inclusion in the digital image. The user may mouth the text tag as a sequence of any recognizable portions of speech, such as individual letters, wholes words, and/or syllables.

Once the user's mouthing of the text tag is complete, the user may release the key or button 13 to terminate the generation of the text tag. The text representation may then be outputted from the text tagging application 37, via the control circuit 30, to drive the video processing circuit 64 and display 12. The result is the altering of the rendering of the digital image in the display by placement of the text tag 59 in the digital image. Thus, in the example of FIG. 3, a user presses and holds the key 13 while mouthing the word "Vacation". The text tag "Vacation" may then be placed within the digital image. In this manner, a text tag may be added to the digital image 15 without having to employ a conventional keypad. In addition, by employing lip reading, the text tag may be added quietly, and thus reduce disturbances to others who may be nearby.

It will be appreciated that the lip reading module may be employed to manipulate a digital image in ways other than text tagging. For example, rather than pressing and holding, a user may press the key 13 without holding to toggle between a visual effects mode and a text tagging mode. Once a mode is selected, a user may press and hold the key 13 to mouth either a visual effects/manipulation command or a text tag, as is commensurate with the selected mode. For example, when in the visual effects mode, the lip reading module may recognize the mouthing of such image manipulation commands as lighten, darken, rotate (left or right), zoom in, zoom out, and others. The manipulation command may then be implemented via the control circuit 30, to drive the processing circuit 64 and display 12 to alter the rendering of the image as desired.

Figure 5:
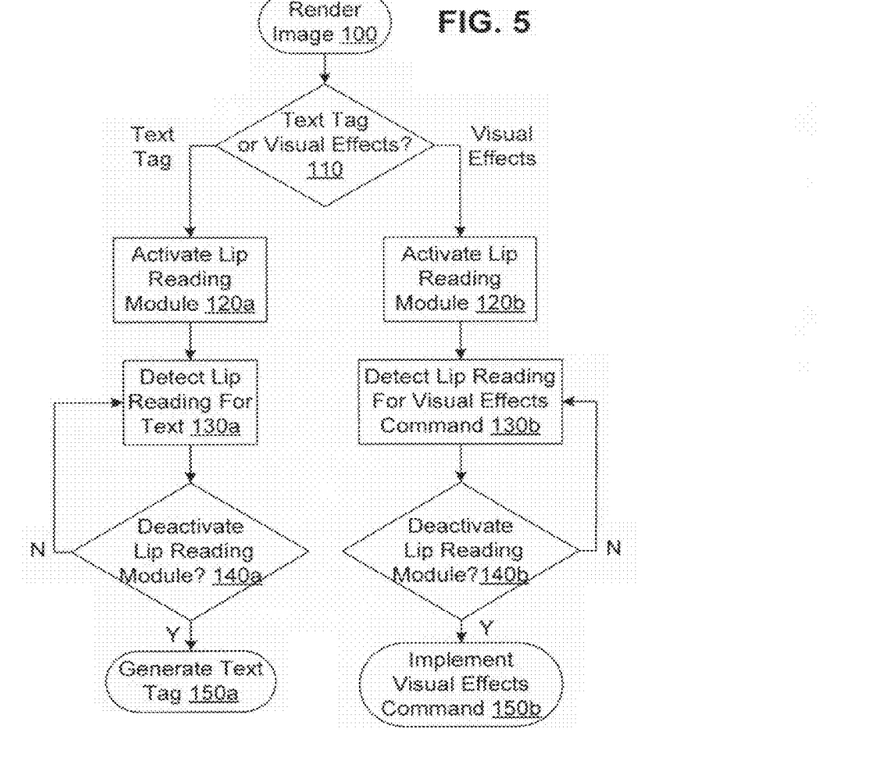
FIG. 5 is a flow chart depicting a first exemplary method of manipulating a digital image.

In accordance with the above, FIG. 5 is a flow chart depicting an exemplary method of manipulating a digital image. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100, at which a digital image is rendered. At step 110, the user may select either a text tagging mode or a visual effects mode. Regardless of the selected mode, at step 120a or 120b, the user may activate the conversion module, which in this case is a lip reading module, such as by pressing and holding the key 13. If in the text tagging mode, the lip reading module at step 130a may detect lip and mouth configuration changes corresponding to a mouthed text tag. When the user has completed mouthing the text tag, at step 140a the user may deactivate the lip reading module, such as by releasing the key 13. At step 150a, the system may generate the text tag, such as by employing the processing circuit to alter the rendering of the digital image to include the text tag. Similarly, if in the visual effects mode, the lip reading module may detect at step 130b lip and mouth configuration changes corresponding to a mouthed visual effects command. When the user has completed mouthing the visual effects command, at step 140b the user may deactivate the lip reading module, again such as by releasing the key 13. At step 150b, the system may implement the visual effects command, such as by employing the processing circuit to alter the rendering of the digital image in accordance with the command.

Although the above description is in connection with lip reading to generate the text tag, other forms of facial detection may be employed in addition or in alternative to lip reading. For example, default text tags may be associated with other facial gestures, such as blinking, non-verbal mouth movements, other head movements, and the like. Speak recognition techniques also may be employed together with lip reading to enhance the text tag creation function.

Note that once a text tag or visual effect has been generated, the digital image may be stored in its altered format. In one embodiment, the altered portions are incorporated into or referenced in the metadata of the image file. The altered digital image may be stored in any conventional storage device, such as the memory 50 of the electronic device 10, or an external or network storage device.

It is desirable, of course, that a text tag be placed at a suitable location within the digital image. For example, in FIG. 3 the text tag is placed adjacent the upper-right corner of the image, apart from the principal subject matter. In this manner, the text tag results in minimal interference with the appreciation of the image. In one embodiment, a text tag may be placed in a default location that, as a matter of probability, would represent a desirable location. For example, a photograph typically would have the principal subject matter centered within the image. An appropriate default location may be adjacent one of the corners, such as the upper-right corner in FIG. 3. If the user deems the default location to be unsuitable for a particular image, the user may move the text tag using conventional input devices, such as a stylus, keypad or touch screen inputs, or the like.

In a preferred embodiment, however, the text tag application 37 may automatically determine an appropriate location for the text tag 59. Referring again to FIG. 2, the application 37 may also include an image analysis module 39. As described in more detail below, based on portions of a digital image rendered on the display, the image analysis module 39 may identify one or more discrete portions of the digital image that represent principal or important subject matter within in the image. Principal subject matter may include people, animals, landmarks, and various other prominent objects within the image. The image analysis module may differentiate portions of the image containing principal subject matter from portions that do not contain principal subject matter (such as relatively featureless land, water, sky, and the like).

Figure 6:
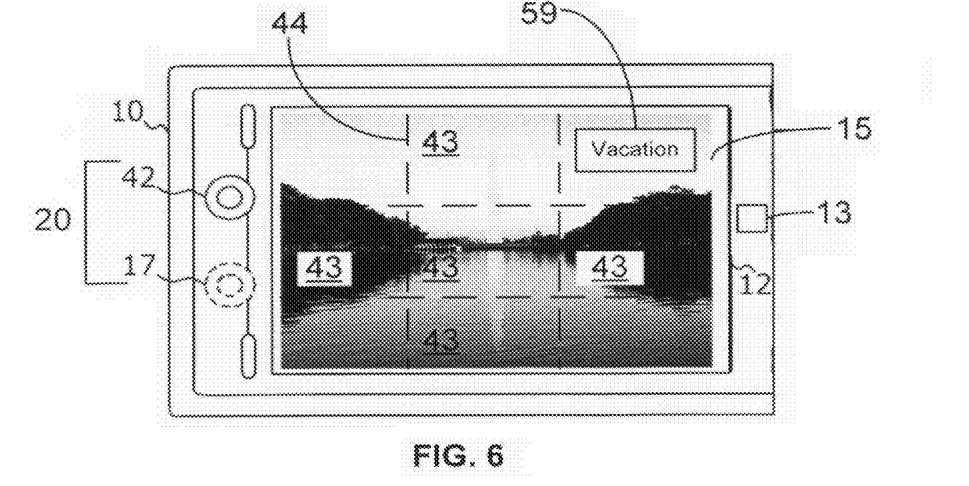
FIG. 6 is a schematic diagram of the exemplary electronic device of FIGS. 1 and 3 in which the digital image is divided into image portions.

Referring to FIG. 6, the image analysis module 39 may divide a digital image 15 into portions with a grid 44. In this example, the grid 44 divides the image 15 into nine rectangular portions of substantially equal area. It should be appreciated that although the grid 44 is represented as rectangles, other shapes and sizes may also be implemented to divide the image. For example, other polygons or shapes may be employed, or the image may be divided by pixels or groups of pixels. In addition, the grid may be formed as part of a computing process, and thus may be invisible to a user and would not actually be displayed or rendered as part of the image 15.

The image analysis module 39 may identify one or more image portions 43 whose boundaries are defined by the grid, and which depict principal subjects or portions of principal subjects within the digital image. The image portions 43 may be identified by any of object detection, face detection, edge detection, or other means for identifying principal subject matter within a digital image 15. For example, in FIG. 6 five portions 43 have been identified that include portions of principal subject matter. The center column portions 43 include portions of the monument and its reflection in the water. The image analysis module has also identified the left-center and right-center portions 43 as containing principal subject matter, recognizing the combination of forest and water. The remaining portions of the image as defined by the grid 44 are, for the most part, relatively featureless regions of sky or water. Accordingly, the text tagging application 37 has caused the text tag to be rendered in one of the predominantly featureless regions (adjacent the upper-right corner), apart from the principal subject matter. In the event the user does not agree with the automatic placement, the user still may have the option of manually altering the placement of the text tag to a more suitable location.

Figure 7:
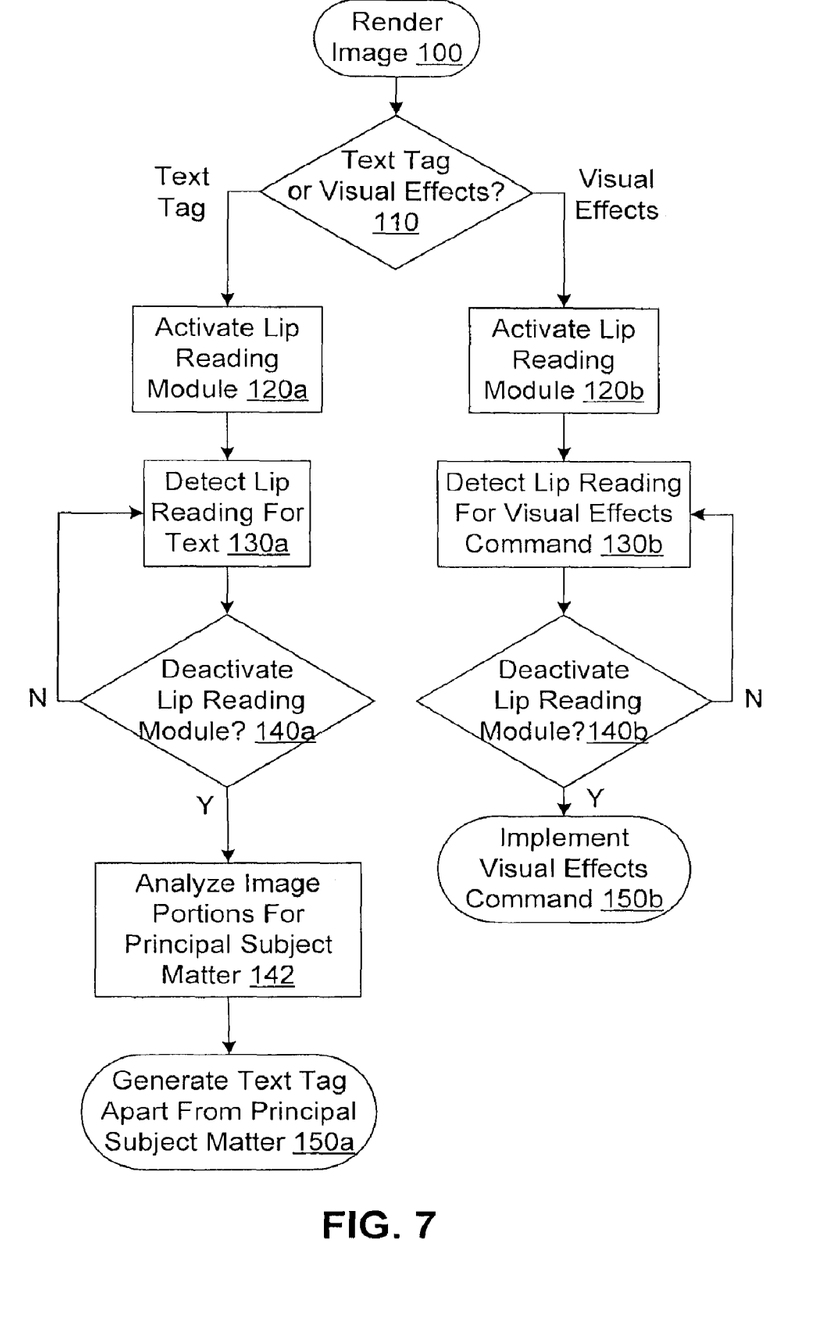
FIG. 7 is a flow chart depicting a second exemplary method of manipulating a digital image.

In accordance with the above, FIG. 7 is a flow chart depicting a second exemplary method of manipulating a digital image. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method of FIG. 7 is analogous to the method of FIG. 5, except in the manner by which the text tag 59 is generated. In FIG. 7, once the user has mouthed the complete text tag and deactivated the lip reading module at step 140*a*, at step 142 the image may be analyzed for portions containing principal subject matter. At step 150*a*, the text tag is rendered apart from the image portions containing principal subject matter. In this manner, the potential for interference with the appreciation of the digital image may be reduced.

It will be appreciated than in the examples of FIGS. 3 and 6, a single text tag 59 has been applied to be associated with the entire image 15. It may be desirable, however, particularly when an image has more than one principal subject, to apply a text tag to a specific portion of the image, rather than the whole. Similarly, it may be desirable to apply multiple text tags, with each text tag pertaining to a specific portion of a digital image.

Figure 8A:
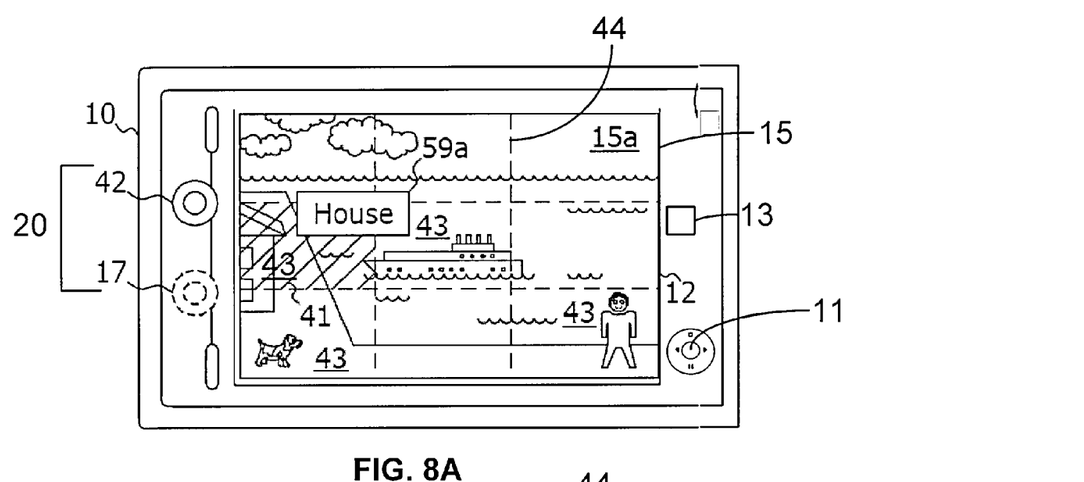
FIGS. 8A-8C are schematic diagrams of an exemplary electronic device in which multiple text tags may be generated for an exemplary image.
Figure 8B:
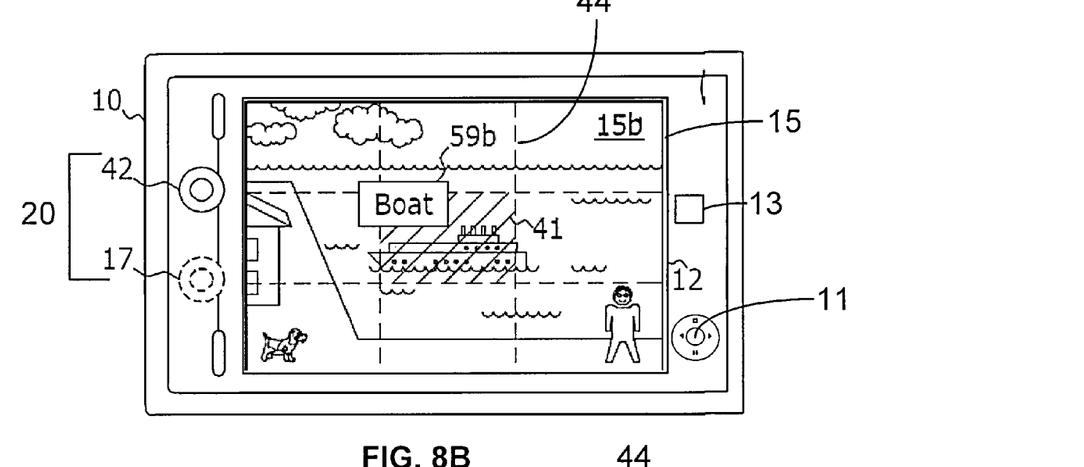
Figure 8C:
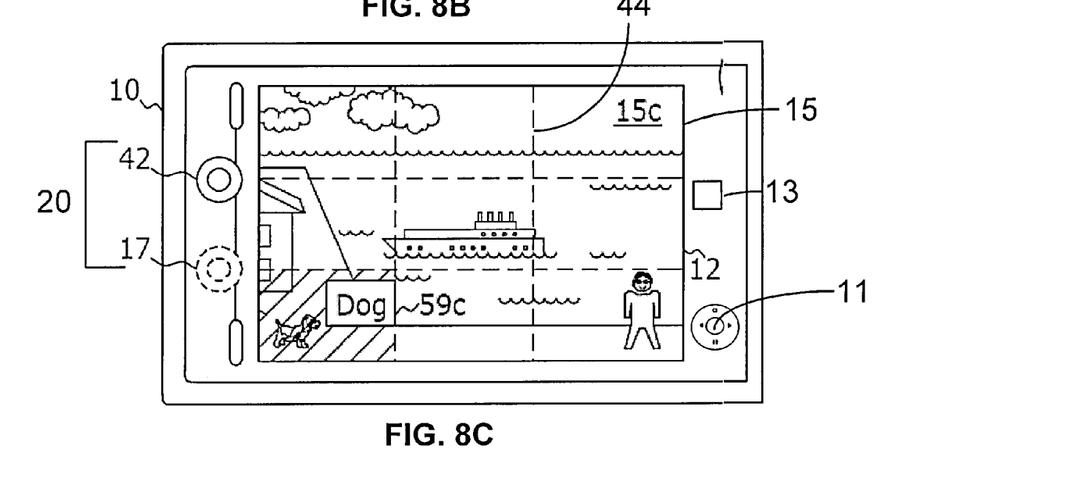

FIGS. 8A-8C depict an exemplary image 15*a-c* in which multiple text tags may be generated. In the manner described above, the image analysis module 39 may divide the image with a grid 44 and identify image portions 43 containing principal subject matter. In this example, as shown in FIG. 8A, four image portions 43 have been identified that contain principal subject matter—a house, a boat, a dog, and a person. A user may navigate the grid to select a specific image portion 43 with a navigation device. For example, the electronic device 10 may have a navigation device in the form of a keypad 11 (see also FIG. 2). In the example of FIGS. 8A-8C, the keypad 11 is a conventional five-way navigation ring, including four directional input surfaces and a center "select" button. A selected image portion may be indicated with an indicator 41, shown in the figures as being slanted lines. It will be appreciated that other indicators may be employed, such as highlighting, shading, and the like. In FIG. 8A, the house image portion 43 has been selected as indicated by the slanted lines. In FIG. 8B, the user has navigated to the boat image portion 43, and in FIG. 8C, the user has navigated to the dog image portion 43, also as indicated by the slanted lines.

Note that as depicted in FIGS. 8A-8C, once a user has navigated to a particular image portion 43, the user may generate a text tag specific to that image portion. Although each figure depicts only one text tag, it will be appreciated that more than one text tag may be generated for a digital image. For example, the resultant digital image 15 may contain all three text tags of "house", "boat", and "dog", or any combinations thereof. A user also may generate text tags additionally to and/or alternatively to those depicted in FIGS. 8A-8C.

Each of the text tags may be generated in the manner described above. For a selected image portion 43, the user may execute the text tagging operation with a press-and-hold key input, such as with key 13. The user image capturing lens 42 may then capture the mouthing of a text tag as a sequence of images, after which the user may release the key input. The lip reading module may interpret the mouth and lip movements, and convert such movements to text, which may then be incorporated as a text tag within the digital image. In addition, the image analysis module 39 may determine a placement of the text tag within the digital image so as to place the text tag within (or partially within) or adjacent to the associated selected image portion, while minimizing interference with the subject of the image portion. A user may repeat such sequence for additional selected image portions to add additional text tags.

Figure 9:
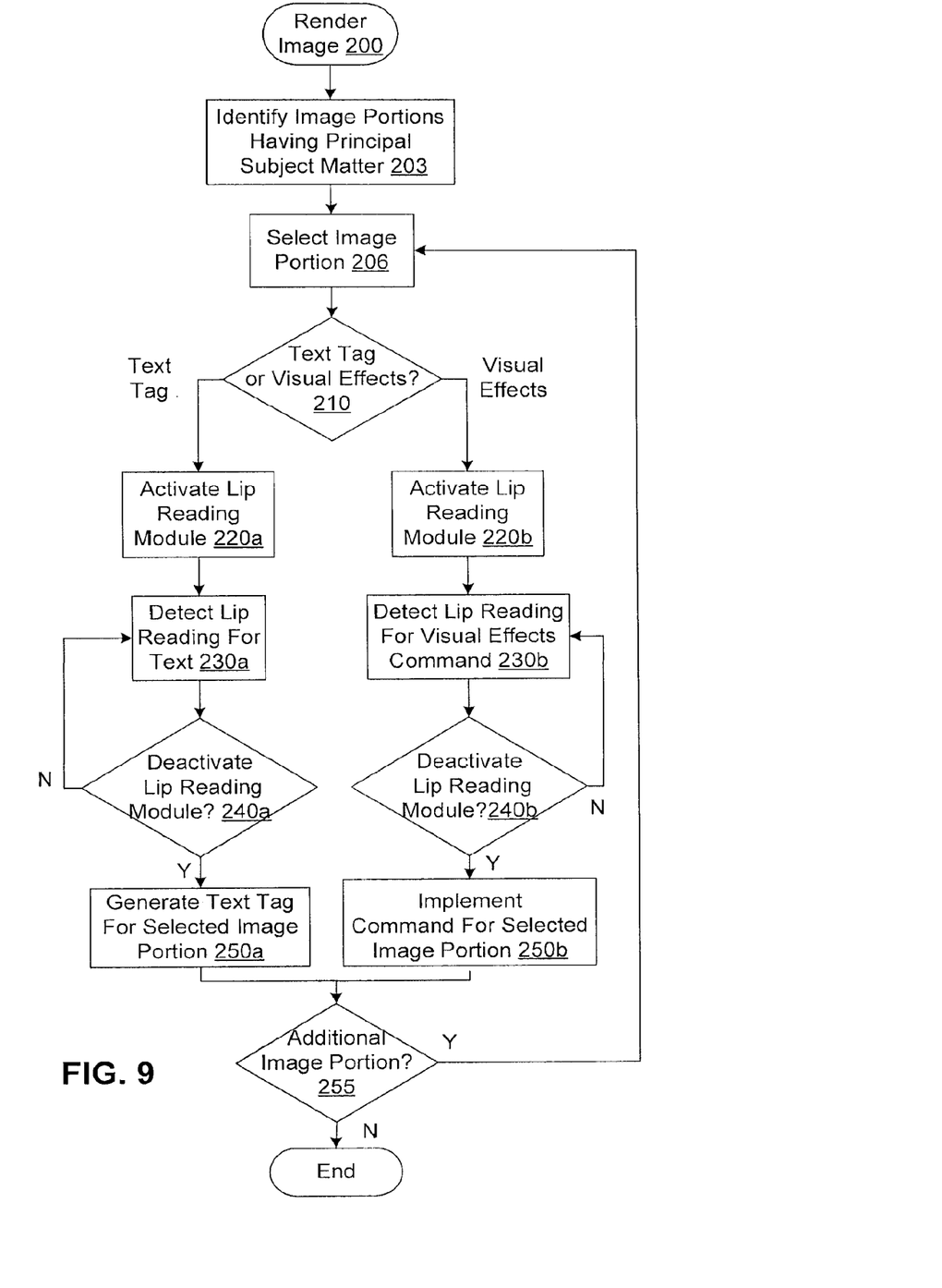
FIG. 9 is a flow chart depicting a third exemplary method of manipulating a digital image.

In accordance with the above, FIG. 9 is a flow charting depicting a third exemplary method of manipulating a digital image. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention. The method of FIG. 9 is comparable to the methods of FIGS. 5 and 7, except that the method of FIG. 9 includes additional steps pertaining to the manipulation of specific image portions within the broader digital image.

The method may begin at step 200 at which the image may be rendered. At step 203, the image analysis module 39 may identify image portions having principal subject matter. At step 206, a selection of one of such image portions may be received, either as a default input or a user input from among the image portions having principal subject matter. At step 210, as before, the user may select either a text tagging mode or a visual effects mode. Regardless of the selected mode, at step 220a or 220b the user may activate the conversion module, which in this example is a lip reading module, such as by pressing and holding the key 13. If in the text tagging mode, the lip reading module at step 230a may detect lip and mouth configuration changes corresponding to a mouthed text tag. When the user has completed mouthing the text tag, at step 240a the user may deactivate the lip reading module, such as by releasing the key 13. At step 250a, the system may generate the text tag, such as by employing the processing circuit to alter the rendering of digital image to include a text tag associated with the selected image portion. Similarly, if in the visual effects mode, the lip reading module may detect at step 230b lip and mouth configuration changes corresponding to a mouthed visual effects command. When the user has completed mouthing the visual effects command, at step 240b the user may deactivate the lip reading module, again such as by releasing the key 13. At step 250b the system may implement the visual effects command, such as by employing the processing circuit to alter the rendering of the selected image portion of the digital image in accordance with the command.

In this embodiment, at step 255 a determination may be made as to whether there is an additional image portion to be manipulated. For example, a user may employ the keypad/navigation ring 11 to select another image portion. If an input of an additional image portion is received at step 255, the method may return to step 206 to manipulate the next image portion. When no additional image portions are selected at step 255, i.e., the user is finished manipulating the image, the method may end.

Referring again to FIG. 2, the text tagging application 37 may also include a facial detection module 40 for detecting one or more facial features of a user. In one embodiment, the facial detection module 40 is an eye detection module 40 for detecting the orientation of the eyes and adjacent facial features. As further described below, the facial/eye detection module 40 may constitute an alternative navigation device for navigating within the digital image and selecting an image portion. The eye detection module may be employed instead of the five-way navigation ring 11 so as provide additional automation and reduce the use of manual inputs. Also as further described below, the user image capturing lens 42 may also capture the movement and orientation of the eyes and adjacent facial features (e.g., the nose). The eye detection module 40 may translate such movements and orientation into a directional input or command for selecting an image portion 43 within the digital image.

Figure 10:
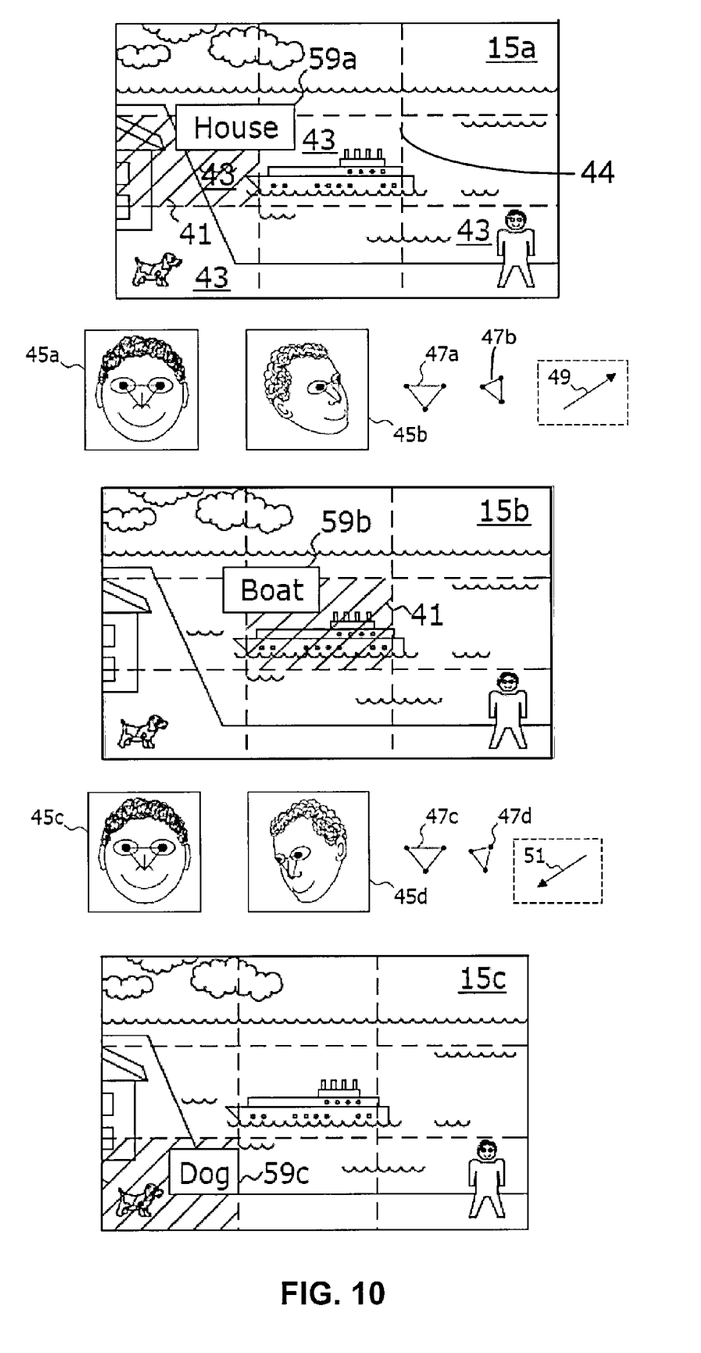
FIG. 10 is an exemplary sequence of figures that depicts an exemplary use of eye detection to select an image portion for manipulation from within a broader digital image.

FIG. 10 is a sequence of figures that depicts the use of eye detection to select an image portion 43 within the digital image 15a-c from the previous figures. For simplicity, the components of the electronic device 10 are omitted from FIG. 10 to focus on the facial detection, and particularly the eye detection-based, selection features.

Similar to FIGS. 8A-8C, in the example of FIG. 10, image portions 43 are determined which contain principal subject matter within the digital image. The image portions 43 may contain such objects commonly tagged in photographs such as people, houses, animals, or other prominent objects, as opposed to relatively featureless portions. In the top drawing of FIG. 10, the left-center image portion 43 has been selected from the digital image 15a, as indicated by the slanted lines indicator 41. As stated above, other indications of selection may be employed, such as shading or highlighting a selected image portion. The user has generated a text tag 59a "House" for this image portion in the manner described above.

Referring to FIGS. 2 and 10, the eye detection module 40 may be employed to select a different image portion 43 as follows. The user image capturing lens 42 may detect the motion and orientation of the user's facial features, particularly the movement and orientation of the user's eyes and adjacent facial features. Such movement and orientation may be captured as a sequence of images and determined by object recognition, edge detection, silhouette recognition or other means for detecting motion of any item or object detected within such sequence of images. The movement of the facial features may then be converted into a directional input as follows. For example, reflections of illumination off the user's cornea may be utilized to determine where on the display 12 the user has focused, and/or to determine a change in position of the user's focus on the display 12. In general, the eye detection module 40 may monitor the sequence of images captured by the user image capturing lens 42, and upon detecting a qualified motion, generate a direction vector representative of the direction of such motion. The direction vector, therefore, corresponds to a directional input. The eye detection module may then generate a repositioning output to change the selection of the particular image portion 43 in accordance with the direction vector. The repositioning output may also cause the video processing circuit 64 to alter the display of the indicator 41 commensurately to reflect the change in the selection of the particular image portion.

For example, in FIG. 10 elements 45a-d represent a sequence of images as may be detected by the eye detection module 40. Thus, the eye detection module 40 monitors the sequence of motion represented by frames 45a-45d. As in previous embodiments, the digital image 15a-c may be segmented into nine segments by the grid 44 by dividing the digital image vertically into thirds and horizontally into thirds. As seen in the top drawing of FIG. 10, after processing by the image analysis module 39, those segments that meet the criteria for principle subject matter are deemed image portions 43. In this example, the left center segment including an image of a house, the center segment including an image of a boat, the left lower segment including an image of a dog, and the right lower segment including an image of a person, may meet the subject criteria and be deemed as image portions 43. The remaining segments include relatively featureless sea or sky and may not meet the selection criteria for principle subject matter. As represented by image 15a, the selection indicator 41 (the slanted lines) is initially positioned at the left-center image portion 43.

To change the image portion selection and reposition the indicator 41, the eye detection module 40 may first detect that the user has turned his head to the right, as depicted in the thumbnail frames from 45a to 45b. The eye detection module 40 may define a direction vector 49 corresponding to the direction of motion of at least a portion of the user's face, as represented, for example, by the change in configuration and orientation of the user's eyes and adjacent facial features. The direction vector 49 may be derived from determining the relative displacement and distortion of a triangle formed by the relative position of the user's eyes and nose tip within the sequence of images captured by the user image capturing lens. For example, triangle 47a represents the relative positions of the user's eyes and nose within frame 45a, and triangle 47b represents the relative position of the user's eyes and nose within frame 45b. The relative displacement between triangle 47a and 47b along with the relative distortion indicate that the user has looked to the right as represented by direction vector 49.

The direction vector corresponds to a directional input based on the change in orientation of the user's facial features. In response to a movement as represented by the direction vector 49, the eye detection module 40 may generate an output signal to reposition the indicator 41 to the image portion 43 to the right of the previously selected image portion. This is depicted in the second rendering 15b, in which the slanted lines indicator 41 now indicates that the center image portion 43 has been selected. The user may now generate a text tag 59b "Boat" for this image portion using the lip reading module in the manner described above.

Similarly, when the user, as depicted in frame 45c, turns his head downward and to the left as depicted in frame 45d, the eye detection module 40 may determine a direction vector 51 corresponding to the direction of the motion of the user's face. Based on the new directional input based on direction vector 51, the eye detection module 40 may generate an output signal to reposition the indicator 41 to the image portion 43 to the lower-left image portion 43 from the previously selected center image portion. This is depicted in the third rendering 15c, in which the indicator 41 now indicates that the lower-left image portion 43 has been selected. The user may now generate a text tag 59c "Dog" for this image portion using the lip reading module in the manner described above.

It should be appreciated that if each of the nine segments represented an image portion 43, there may exist an ambiguity as follows. For example, overlaying the direction vector 49 on the digital image indicates that the movement of the indicator 41 (from the center right position as depicted in rendering 15a) could be to the upper-center portion of the digital image, the center portion of the digital image, or the upper right portion of the digital image. However, by first utilizing the image analysis module 39 to identify only those image portions meeting selection criteria for principal subject matter (as opposed to relatively featureless portions), only those image portions that depict principal subject matter will represent image portions 43. As such, there is little ambiguity that only the center portion is positioned relative to the center right portion in the direction of the direction vector 49. Accordingly, the motion represented by displacement of the user's face between frame 45a to 45b (resulting in vector 49) and from 45c to 45d (resulting in vector 51) results in the selection of an appropriate image portion 43 containing principal subject matter. Should a digital image indeed contain principle subject matter in every or nearly every portion of the grid 44, then the ambiguity may be resolved by always moving the selection to an adjacent image portion. Using multiple, single step movements, any image portion may be selected regardless of the starting position.

In the example of FIG. 10, only one text tag at a time is depicted within the digital image. As stated above respect to other embodiments, multiple text tags may be placed on a single digital image. The text tags may also be highlighted so that eye detection may interpret eye movements comparable to the manner described above to position the text tag within the image. Also as stated above, the lip reading module may be employed to manipulate a digital image in ways other than text tagging. For example, in a visual effects mode, the lip reading module may recognize the mouthing of such image manipulation commands as lighten, darken, rotate (left or right), zoom in, zoom out, and others. The manipulation command may then be implemented via the control circuit 30, to drive the video processing circuit 64 and display 12 to manipulate the selected image portion as desired. In another embodiment, the lip reading module may be used in the visual effects mode to select the image portion 43. For example, the lip reading module may recognize directional commands such as "left", "right", "up" and "down" to generate a repositioning of the selection indicator 41.

Figure 11:
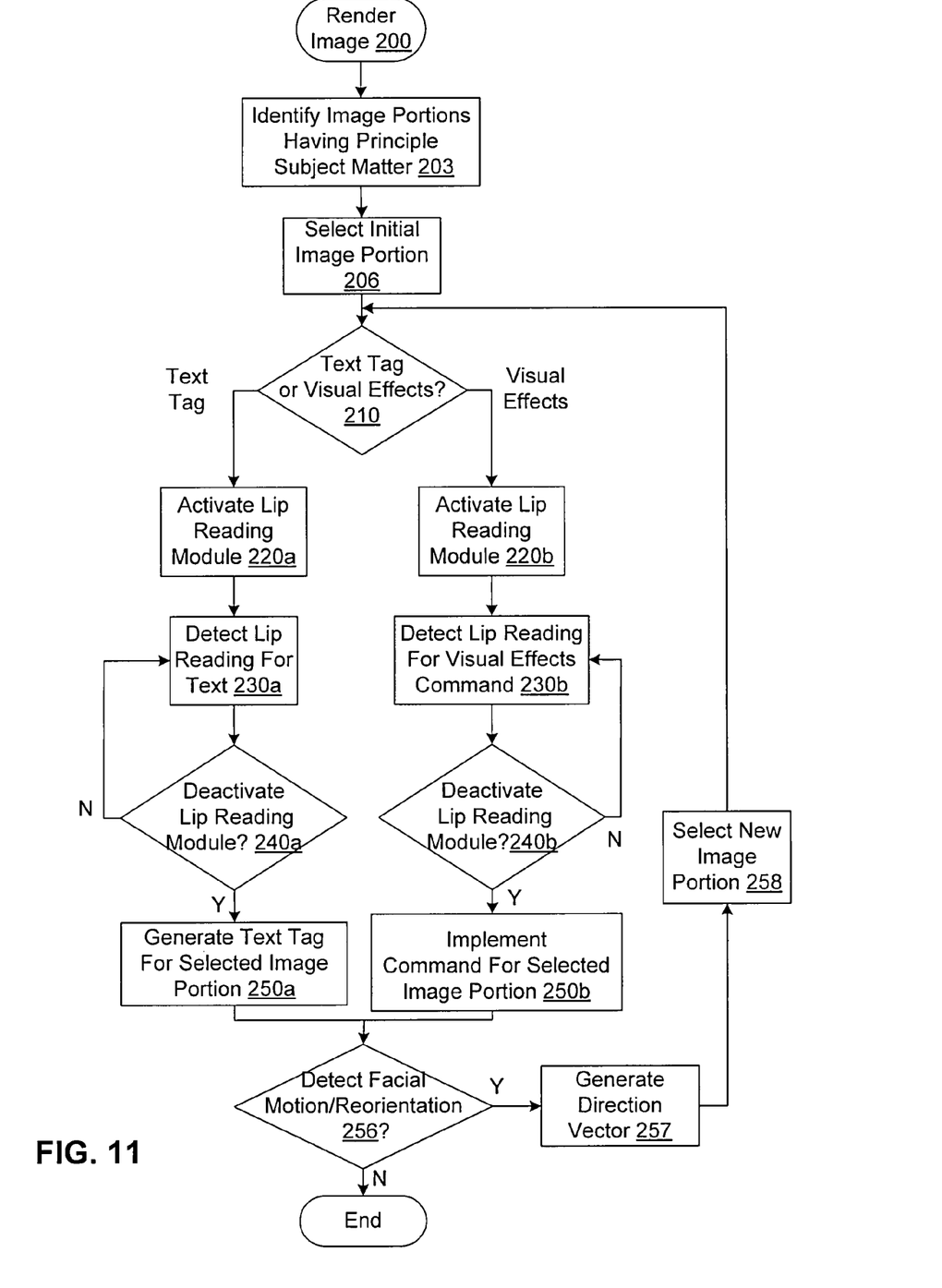
FIG. 11 is a flow chart depicting a fourth exemplary method of manipulating a digital image.

In accordance with the above, FIG. 11 is a flow chart depicting a fourth exemplary method of manipulating a digital image. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method of FIG. 11 is analogous to the method of FIG. 9, except that FIG. 11 includes the use of eye detection to receive the selection of the additional image portion. In FIG. 11, once a text tag or visual effects command has been applied for the selected image portion at either of steps 250a or 250b, at step 256 a determination may be made as to whether a facial motion or reorientation is detected, such as a reorientation of the user's eyes and adjacent facial features. If so, at step 257 a direction vector may be generated commensurate with the motion or reorientation of the user's facial features. Based on the direction vector, at step 258 a new image portion may be selected for manipulation. The method may then return to step 210 to apply a text tag or visual effects command to the newly selected image portion as desired by the user.

Figure 12:
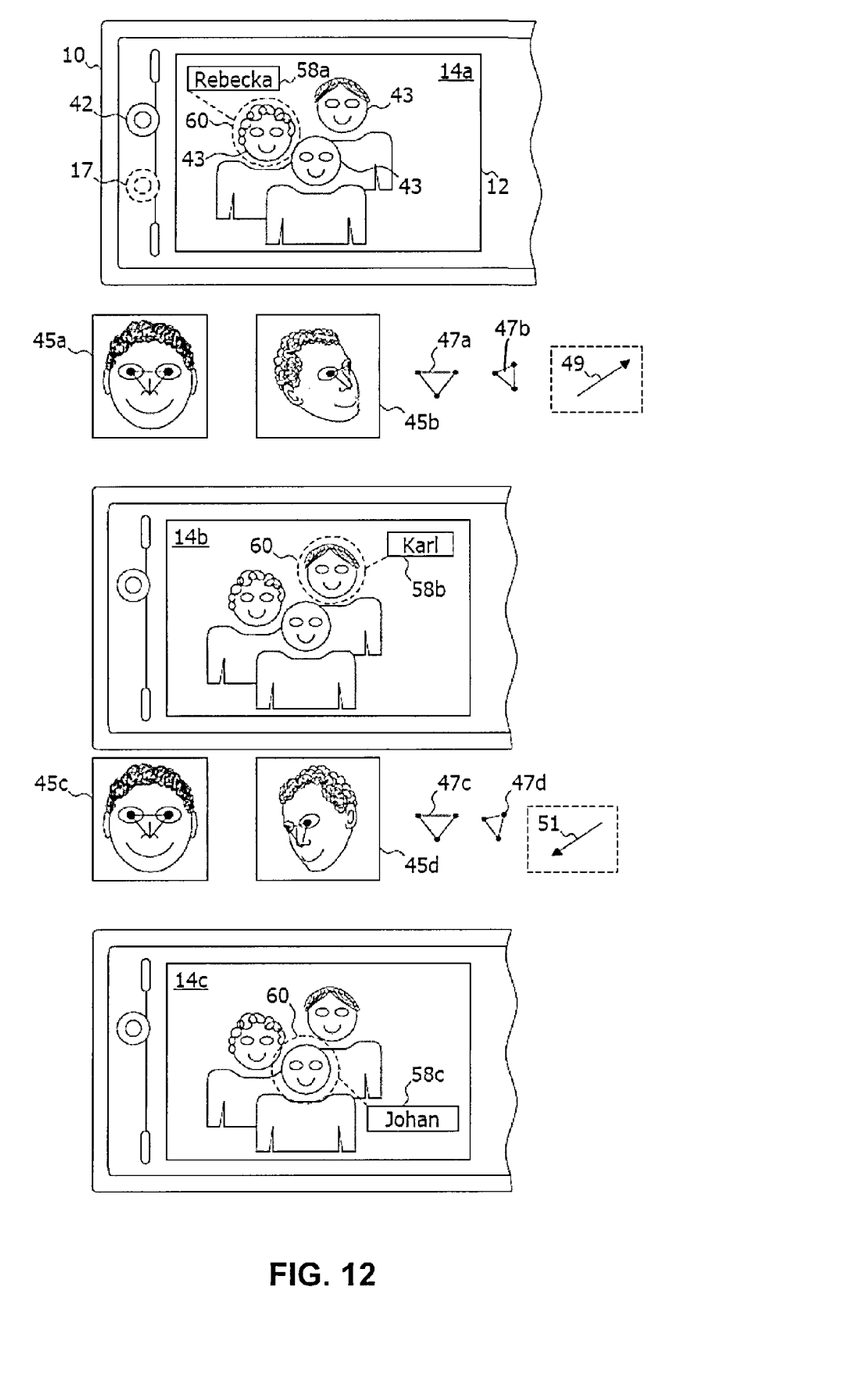
FIG. 12 is a second exemplary sequence of figures that depicts an exemplary use of eye detection to select an image portion for manipulation from within a broader digital image.

FIG. 12 depicts another example in which the text tagging and image manipulation features are applied to an exemplary digital image. In this example, a digital image 14a-c depicts several people. The image analysis module 40 has identified each face as representing a principle subject, and rather than a grid, a circular indicator 60 is employed to identify each face as an image portion 43 for text tagging or other manipulation. For example, in the top rendering 14a, the left-most person has been selected as indicated by the indicator 60, and the user has generated a text tag 58a "Rebecka". To select another individual within the digital image, the facial/eye detection module 40 may receive a sequence of images of the user via the user image capturing lens 42. The sequence of images is again represented in FIG. 12 as elements 45a-d. In particular, from the user motion from 45a to 45b, the eye detection module 40 generates a direction vector 49 that results in the selection of the commensurate image portion. As shown in rendering 14b, the image portion to the upper-right of Rebecka has been selected, and the user generates a text tag 58b "Karl" for the newly selected image portion. From the user motion from 45c to 45d, the eye detection module 40 generates a direction vector 51 that results in the selection of the commensurate image portion. As shown in rendering 14c, the image portion to the lower-left of Karl has been selected, and the user generates a text tag 58c "Johan" for the newly selected image portion.

As before, although only one text tag is shown at a time in FIG. 12, multiple text tags may be generated simultaneously for the same digital image. In addition, when the subject matter of an image portion 43 is a person, an additional visual effects command may be red-eye correction.

As referenced above, once any of the text tags or visual effects has been generated in accordance with any of the described embodiments, the altered digital image may be stored in its altered format. In one embodiment, the altered portions are incorporated into or referenced in the metadata of the image file. The altered digital image may be stored in any conventional storage device, such as the memory 50 of the electronic device 10, or an external or network storage device.

Although the invention is been described with reference to a digital photograph, the embodiments may be implemented with respect to other digital images. For example, a user may add comments to a document rendered on a display, a webpage downloaded from the Internet or other network, or any other digital image.

Figure 13:
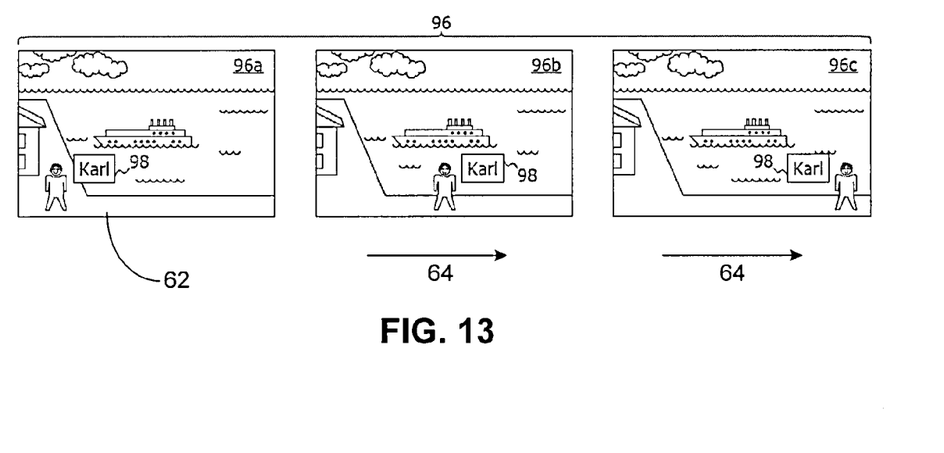
FIG. 13 depicts an exemplary text tagging as applied to a moving video image.

For example, FIG. 13 depicts an exemplary application of the present invention to a moving video image 96. The exemplary video image 96 includes a plurality of frames 96a, 96b, and 96c. The frames of the video image 96 may be stored in a database, such as the memory 50 of the electronic device 10, may be real-time frames generated in the viewfinder (display 12) by the camera assembly 20, or real time frames streamed from an external video source or network.

In general, utilizing the features of previous embodiments, a text tag 98 may be added to one of the frames (for example frame 96a). Such text tag 98 may then be recorded as part of the video file as described above. In this manner, the text tag becomes associated with the particular tagged frame. Thus, frame 96a may be identified in the video file as a "tagged frame" 62. Subsequent motion of the portion of the image that was tagged (e.g. the depiction of Karl) is recorded as object motion data 64, as indicated by the arrows in the figure. As such, when subsequent frames 96b or 96c of the video clip 96 are rendered, the image analysis module recognizes the same depiction in such subsequent frames, and the text tag 98 remains with the portion of the image originally tagged, even as that portion is relocated with in the frame. The text tag 98 thus "follows" Karl throughout the video.

In the above embodiment, the video may be tagged while a user replays a video. In another embodiment, the user may tag the video comparable to the above while the video is being recorded. Because the tagging is based upon lip reading by the lip reading module, the video may be tagged in the form of comments without the need to incorporate an audio soundtrack. The comments may appear in the video as text tags while the video is replayed. Additionally or alternatively, the tags may be stored to provide a means of searching for video about a particular subject matter. For example, if a user tags multiple videos of a particular person with the person's name, the tags may be used to search a database to locate such videos that include the person of interest.

As referenced above, once any of the text tags or visual effects has been generated in accordance with any of the described embodiments, the altered digital image may be stored in its altered format. In one embodiment, the altered portions are incorporated into or referenced in the metadata of the image file. The altered digital image may be stored in any conventional storage device, such as the memory 50 of the electronic device 10, or an external or network storage device. In additional, the alteration may be stored in a separate database that would permit searching features. In one embodiment, the alterations, such as text tags and image manipulations, may be stored as a metadata fields associated with the respective digital images.

Figure 14:
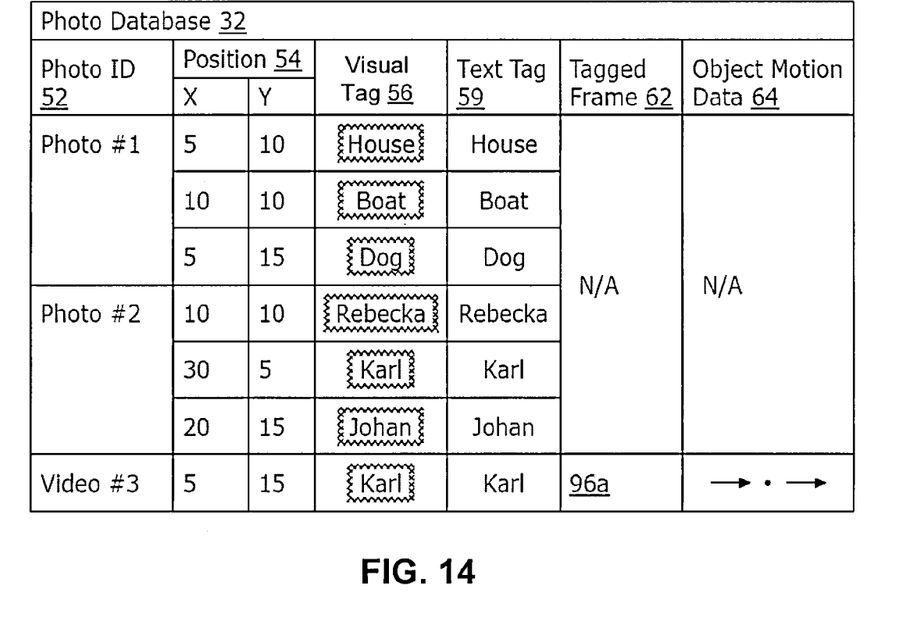
FIG. 14 depicts an exemplary database of text tags generated from various examples described herein.

For example, FIG. 14 depicts an exemplary database 32 of text tags from the various examples described above. Each digital file may be associated with an identification (Photo ID) 52, a position 54 of the text tag within the digital image, and the text tag content 59. In one embodiment, the system may also store the sequence of images interpreted by the lip reading module as a visual tag 56. If the image is a video, such as the image of FIG. 13, the database may also include data pertaining to the tagged frame 62 and object motion data 64. It will be appreciated that the database described herein is an example, and the precise content and format of the database may be varied. In particular, the metadata may constitute stored metadata fields that are associated with the respective digital images.

The database 32 (or comparable metadata) may provide a searching function. A user may enter a search term corresponding to a text tag in any conventional manner. The search results may encompass digital images having the searched text tag. For example, if a user desired access to stored images that have been tagged as including "Rebecka", the user may enter "Rebecka" as a search term to find such digital images.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

The invention claimed is:

1. An electronic device comprising:
a rendering device for rendering a digital image;
a user image capturing device for capturing a sequence of images of a user;
a conversion module for converting the sequence of images into a manipulation command for manipulating the digital image; and
a processing circuit for altering the rendering of the digital image in accordance with the manipulation command; wherein
the conversion module comprises a lip reading module and the sequence of images is a sequence of motion of the user's facial features, wherein the lip reading module converts the motion of the user's facial features into a text tag as the manipulation command; and
the processing circuit alters the rendering of the digital image to include the text tag; and
further comprising an image analysis module for determining the placement of the text tag within the digital image by identifying at least one image portion within the digital image in which principal subject matter is contained, and placing the text tag within the digital image apart from the image portion depicting the principal subject matter.

2. The electronic device of claim 1, wherein the lip reading module converts the motion of the user's facial features into a visual effects command, and the processing circuit alters the rendering of the digital image to implement the visual effects command.

3. The electronic device of claim 2, wherein the visual effects command is at least one of lightening the digital image, darkening the digital image, zooming in, zooming out, rotating the digital image, or performing red-eye correction on a subject contained in the digital image.

4. The electronic device of claim 1, further comprising a storage device for storing the altered digital image.

5. An electronic device comprising:
a rendering device for rendering a digital image;
an image analysis module for selecting at least one image portion within the digital image in which principal subject matter is contained;
a user image capturing device for capturing a sequence of images of a user;
a conversion module for converting the sequence of images into a manipulation command for manipulating the digital image in a manner associated with the selected image portion;
a processing circuit for altering the rendering of the digital image in a manner associated with the selected image portion in accordance with the manipulation command; and
a navigation device for selecting a second image portion within the digital image;
wherein the user image capturing device captures a second sequence of images of the user, the conversion module converts the second sequence of images into a second manipulation command for manipulating the digital image in a manner associated with the second image portion, and the processing circuit alters the rendering of the digital image in a manner associated with the second image portion in accordance with the second manipulation command; and
the navigation device comprises a facial detection module for detecting a facial motion of the user corresponding to a directional input.

6. The electronic device of claim 5, wherein the conversion module comprises a lip reading module and the sequence of images is a sequence of motion of the user's facial features, wherein the lip module converts the motion of the user's facial features into the manipulation command.

7. The electronic device of claim 6, wherein the lip reading module converts the motion of the user's facial features into a text tag, and the processing circuit alters the rendering of the digital image to include the text tag associated with the selected image portion.

8. The electronic device of claim 6, wherein the lip reading module converts the motion of the user's facial features into a visual effects command, and the processing circuit alters the rendering of the selected image portion within the digital image to implement the visual effects command.

9. The electronic device of claim 8, wherein the visual effects command is at least one of lightening the image portion, darkening the image portion, zooming in, zooming out, rotating the image portion, or performing red-eye correction on a subject contained in the image portion.

10. The electronic device of claim 5, wherein the facial detection module comprises an eye detection module for detecting the user's eyes, and the directional input is a detected change in the orientation of the user's eyes.

11. A method of manipulating a digital image comprising the steps of:
rendering the digital image;
capturing a sequence of images of a user;
converting the sequence of images of the user into a manipulation command for altering the rendering of the digital image;
determining the placement of the image manipulation by identifying at least one image portion within the digital image in which principal subject matter is contained, and
altering the rendering of digital image in accordance with the manipulation command by placing the image manipulation within the digital image apart from the image portion depicting the principal subject matter.

12. The method of claim 11, further comprising:
selecting a second image portion within the digital image in which principal subject matter is depicted;
capturing a second sequence of images of a user;
converting the second sequence of images of the user into a second manipulation command for altering the rendering of the digital image in a manner associated with the second image portion; and
altering the rendering of the digital image in a manner associated with the second image portion in accordance with the manipulation command.

* * * * *